US010189715B2

(12) United States Patent
Landskron et al.

(10) Patent No.: US 10,189,715 B2
(45) Date of Patent: Jan. 29, 2019

(54) ULTRAHARD STISHOVITE NANOPARTICLES AND METHODS OF MANUFACTURE

(71) Applicant: Lehigh University, Bethlehem, PA (US)

(72) Inventors: Kai Landskron, Bethlehem, PA (US); Paritosh Mohanty, Bethlehem, PA (US); Yingwei Fei, Potomac, MD (US)

(73) Assignee: Lehigh University, Bethlehem, PA (US)

(*) Notice: Subject to any disclaimer, the term of this patent is extended or adjusted under 35 U.S.C. 154(b) by 68 days.

(21) Appl. No.: 15/086,607

(22) Filed: Mar. 31, 2016

(65) Prior Publication Data
US 2016/0214866 A1 Jul. 28, 2016

Related U.S. Application Data

(62) Division of application No. 12/697,753, filed on Feb. 1, 2010, now abandoned.

(60) Provisional application No. 61/148,588, filed on Jan. 30, 2009.

(51) Int. Cl.
C01B 33/18 (2006.01)
C09K 3/14 (2006.01)

(52) U.S. Cl.
CPC .......... C01B 33/181 (2013.01); C09K 3/1409 (2013.01)

(58) Field of Classification Search
CPC ..................... C01B 33/181; C09K 3/1409
See application file for complete search history.

(56) References Cited

U.S. PATENT DOCUMENTS

| 6,759,502 | B1 | 7/2004 | Tang |
| 6,979,357 | B2 | 12/2005 | Fries |
| 7,309,477 | B2 | 12/2007 | Hemley |
| 7,645,308 | B2 | 1/2010 | Kaner |
| 2004/0172885 | A1 | 9/2004 | Middlemiss |
| 2007/0187155 | A1 | 8/2007 | Middlemiss |

(Continued)

FOREIGN PATENT DOCUMENTS

| FR | 2750982 | 1/1998 |
| JP | 2004196567 | 12/2002 |
| WO | 20090125370 | 10/2009 |

OTHER PUBLICATIONS

SBA-16 Materials Synthesis, Diffusion and Sorption Properties to Cobin 2006.*

(Continued)

Primary Examiner — Shuangyi Abu Ali
(74) Attorney, Agent, or Firm — Saul Ewing Arnstein & Lehr LLP; Domingos J. Silva

(57) ABSTRACT

Compositions comprising nanoparticles (e.g., nanocrystals) of stishovite silica are described. Such nanoparticles may be made by (1) subjecting a mesoporous silica starting material (e.g., SBA-16 or KIT-6) to a pressure of less than about 20 GPa (e.g., about 12 GPa); (2) heating the mesoporous silica starting material while under pressure to an elevated temperature of less than about 1000° C. (e.g., a temperature of between about 300° C. and about 400° C.); and thereafter isolating the nanoparticles. The nanoparticles may be used in a work tool that is configured and adapted for cutting, drilling, abrading, polishing, machining, or grinding, among other uses.

5 Claims, 7 Drawing Sheets

(56) References Cited

U.S. PATENT DOCUMENTS

| | | |
|---|---|---|
| 2007/0209554 A1* | 9/2007 | Garcia Luna ........... C01B 33/18 |
| | | 106/287.34 |
| 2008/0073126 A1 | 3/2008 | Shen |
| 2008/0107602 A1 | 5/2008 | Ellis |
| 2008/0193361 A1 | 8/2008 | Lowther |
| 2009/0022969 A1 | 1/2009 | Zhang |
| 2009/0074604 A1 | 3/2009 | Chen |
| 2010/0015026 A1 | 1/2010 | Yang |

OTHER PUBLICATIONS

Hemeley et al., "Raman Spectrum of Natural and Synthetic Stishovite," Phys Chem Minerals (1986), vol. 13, pp. 285-290.

Luo et al., "Spontaneous disordering of nm-grain-sized polycrystals and clusters of silica stishovite," Solid State Communications 136 (2005), pp. 71-75.

Mohanty et al., "Synthesis of Periodic Mesoporous Coesite," Journal American Chemical Society, Jun. 23, 2009.

Ross et al., "High-pressure crystal chemistry of stishovite," American Mineralogist, vol. 75, pp. 739-747, 1990.

Sinclair and Ringwood, "Single crystal analysis of the structure of stishovite," Nature, vol. 272, Apr. 20, 1978, pp. 714-715.

* cited by examiner

ULTRAHARD STISHOVITE NANOPARTICLES AND METHODS OF MANUFACTURE

CROSS-REFERENCE TO RELATED APPLICATIONS

This application is a divisional of U.S. patent application Ser. No. 12/697,753, filed Feb. 1, 2010, which claims the benefit of priority under 35 U.S.C. § 119(e) to U.S. Patent Application No. 61/148,588, filed Jan. 30, 2009, the entire contents of both of which are hereby incorporated herein by reference.

FIELD

This disclosure relates to ultrahard particulate compositions, including compositions comprising stishovite nanoparticles or nanocrystals, and methods for their manufacture.

BACKGROUND

Ultrahard nanomaterials are used extensively in cutting, milling, grinding, drilling, and other abrasive operations. Ultrahard abrasive particles currently in use include diamond, cubic boron nitride, silicon carbide (commonly known as carborundum or carbide), and silicon nitride. Of the foregoing compounds, diamond is the hardest. In fact, diamond is the hardest known material, and it is used in many modern applications such as grinding, drilling rocks, cutting concrete, polishing stones, and machining. Unfortunately, carbon's inherent reactivity with iron and silicon limit its use in some applications, such as machining steel. Therefore, a continuing and unmet need exists for alternative ultrahard particulate materials, including materials that may be used in the place of diamond.

BRIEF SUMMARY

Nanocrystalline stishovite is unknown in the chemical and materials science arts. The present invention provides the first known synthesis of stishovite nanocrystals, which are made from periodic mesoporous silicas by a high pressure synthesis method using a multi anvil apparatus. Heretofore, the only known and reported synthetic preparations of stishovite were limited to the bulk material. Such methods also required temperatures and pressures that are not reasonable or economical for commercial synthesis. Because of its relatively facile synthesis of the new methods of this invention, such nanocrystals are now commercially practical for use as a hard material in industrial applications such as cutting and polishing, among other uses.

In an embodiment, the invention provides a composition comprising (or consisting essentially of) nanoparticles (e.g., nanocrystals) of stishovite silica.

In another embodiment, the invention provides a method of manufacturing nanoparticles (e.g., nanocrystals) of stishovite silica comprising (1) subjecting a mesoporous silica starting material (e.g., SBA-16 or KIT-6) to a pressure of less than about 20 GPa (e.g., a pressure of between about 10 GPa and about 12 GPa); (2) heating the mesoporous silica starting material while under pressure to an elevated temperature of less than about 1000° C. (e.g., a temperature of between about 300° C. and 1000° C. (e.g., 400° C.)); and thereafter isolating nanoparticles (e.g., nanocrystals) of stishovite silica.

In yet another embodiment, the invention provides a work tool comprising nanoparticles of stishovite silica. Such a work tool may be configured and adapted for cutting, drilling, abrading, polishing, machining, or grinding, among other uses.

DETAILED DESCRIPTION

Figure 1A:
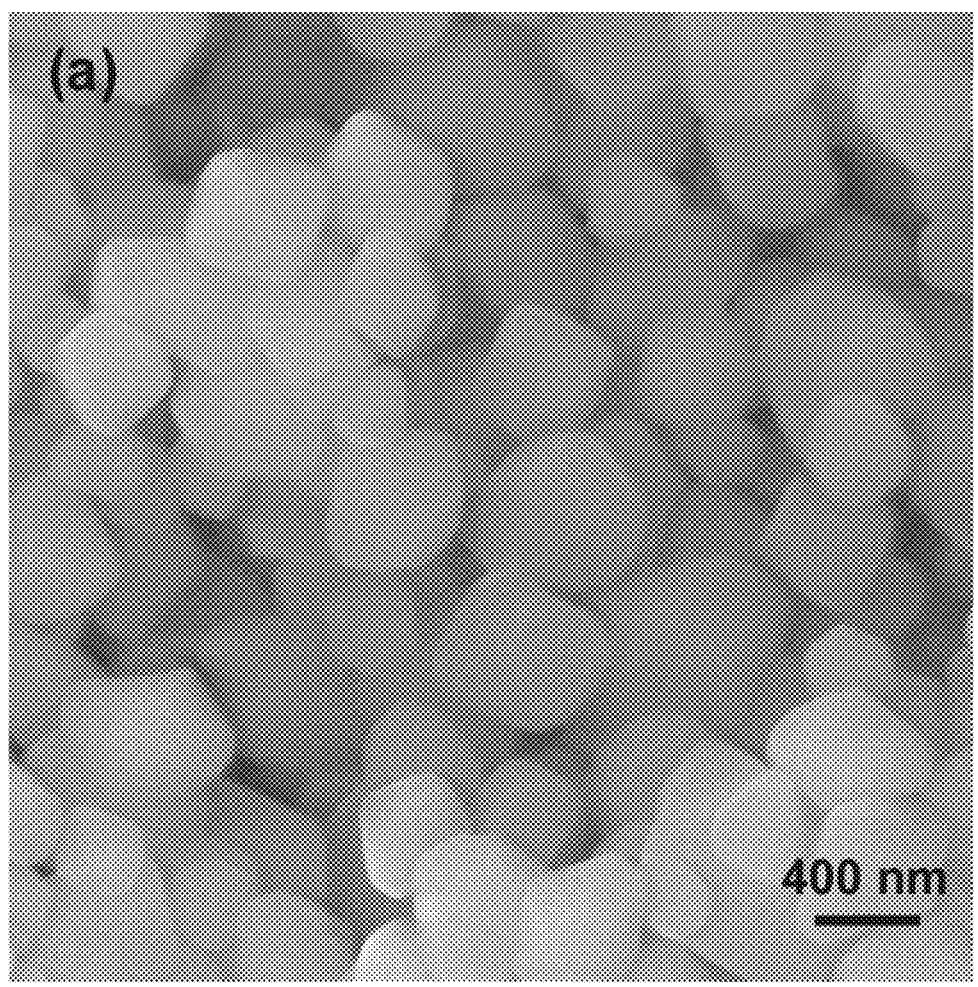
FIG. 1(a) is a SEM image of stishovite nanocrystals, which were made using SBA-16 as a starting material in accordance with an exemplary embodiment of the invention.

Stishovite is a high-pressure polymorph of silica that was first synthesized in the laboratory and later observed in the shocked specimens from terrestrial impact structures. It is one of the hardest oxidic materials, with hardness of 33 gigapascals (GPa). Recently, an anisotropic hardness was observed for the single crystalline stishovite, and its hardness was reported as 31.8±1.0 GPa along the c-axis and 26.2±1.0 GPa along a perpendicular direction. Luo et al., Physica B 399, 138 (2007). Because of its hardness, nanoparticles of stishovite are especially useful as abrasives and cutting agents.

This invention relates, in part, to novel compositions of nanoparticles or nanocrystals of stishovite silica ($SiO_2$). Some examples of compositions include purified and isolated nanoparticles, which are essentially free of other materials or compounds. Additional examples of compositions include colloidal suspensions of stishovite nanoparticles or nanocrystals in a colloidal matrix (e.g., pH-adjusted water). Colloidal suspensions include small particles (particularly monodisperse particles) dispersed in the matrix, and they remain dispersed (but not dissolved) in the matrix. Still other examples of compositions of the invention include stishovite nanoparticles mixed with other polishing, grinding, or abrading agents. The foregoing compositions are useful in polishing, grinding, cutting, and similar applications.

This invention also relates, in part, to methods of manufacturing nanoparticles of stishovite silica. An exemplary method of manufacture includes (1) subjecting a mesoporous silica starting material to a pressure of less than about 20 GPa (e.g., 12 GPa); (2) heating the mesoporous silica starting material while under pressure to an elevated temperature of at least about 300° C.; and thereafter isolating nanoparticles of stishovite silica. Advantages of this method include the relatively low temperatures and pressures required. As opposed to other methods for the synthesis of stishovite silica (which, as noted above, only describe the synthesis of the bulk material, not nanocrystals), the present invention provides a synthesis method that is commercially viable.

According to the invention, the method of manufacture of stishovite nanocrystals begins with mesoporous silica as a starting material, particularly cubic (as opposed to hexagonal) mesoporous silicas. "SBA-16" and "KIT-6" are some well known examples of mesoporous silicas having cubic symmetry. See, e.g., Kim et al., J. Phys. Chem. B 108, 11480 (2004); Kim et al., J. Mater. Chem. 15, 1560 (2005); Kleitz et al., Langmuir 22, 440 (2006); Zhao et al., Science 279, 548 (1998); and Mohanty et al., J. Am. Chem. Soc. 131, 9638-39 (2009). See also, US Patent Publication No. 2010/0015026 (Jan. 21, 2010).

For example, SBA-16, mesoporous silica with Im$\bar{3}$m body centered cubic symmetry, may be used as a starting material. In a typical stishovite synthesis, approximately 20 mg of SBA-16 was placed in a platinum capsule, and it was heated in a Re furnace. The pressure of the system was increased to 12 GPa with a rate of about 1-2 GPa per hour. After the pressure of the system reached the desired value of 12 GPa, the temperature was raised to 400° C. with a heating rate of about 100° C. per minute. It was kept at that temperature for 5 minutes (or more generally, between about 2 minutes and about 20 minutes) and then quenched to room temperature (i.e., about 20° C. to about 25° C.).

Figure 1B:
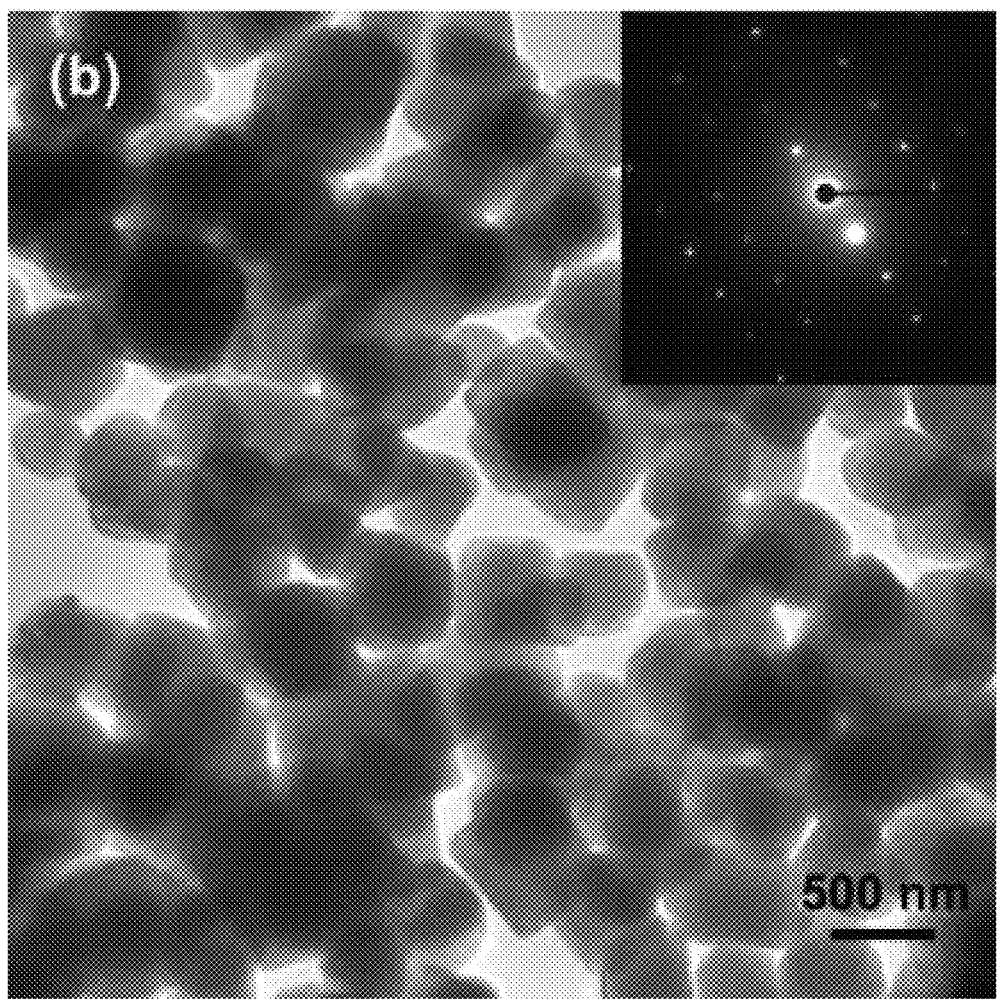
FIG. 1(b) is a TEM image of the stishovite nanocrystals referred to in FIG. 1. The SAED pattern is given in the inset of FIG. 1(b).

This synthesis of stishovite silica from the SBA-16 precursor resulted in the formation of faceted nanocrystals, which are evident in the SEM and TEM images illustrated in FIGS. 1(a)-(b). The average particle size was measured to be between 200 to 400 nm. The particles are of faceted polygonal shapes, which can be seen in the SEM image (FIG. 1(a)). The nanocrystals are clearly not sintered together, which is plainly evident by the SEM image (FIG. 1(a)). Additionally, the SAED pattern (inset of FIG. 1(b)) shows bright and regular arrays of diffraction spots, which indicates that the individual nanoparticles are single crystals.

Figure 5:
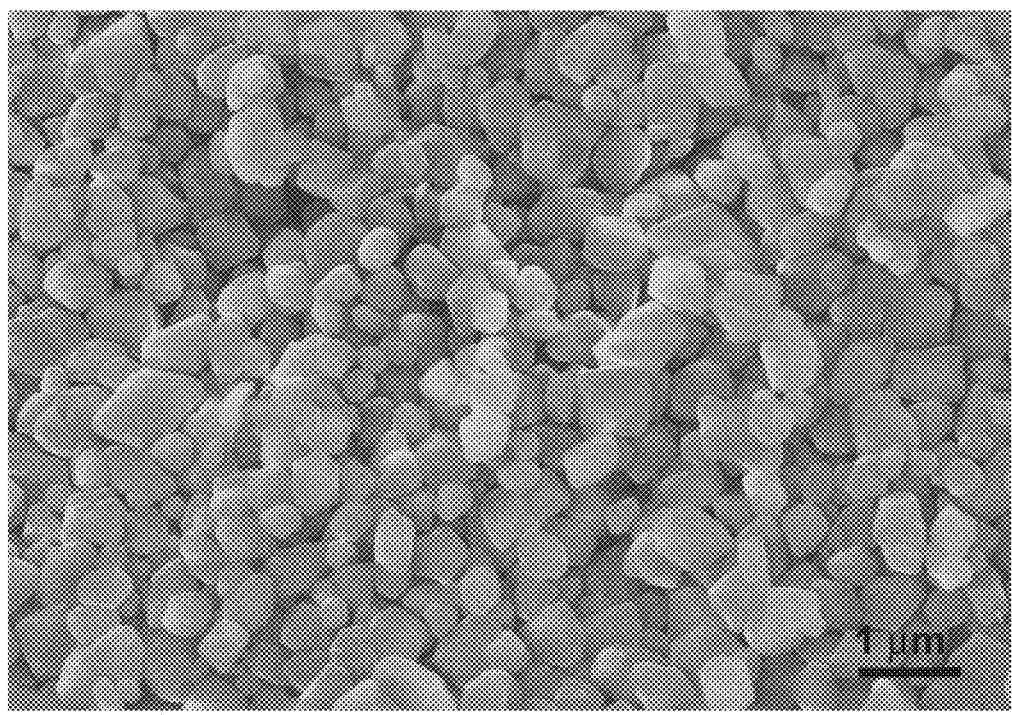
FIG. 5 is a SEM image of stishovite nanocrystals, which were made using KIT-6 as a starting material in accordance with another exemplary embodiment of the invention.

It should be noted that the terms "nanoparticles" and "nanocrystals" refer herein to particles or crystals having an average size of between about 2 nm and about 1000 nm (e.g., between about 200 nm and 800 nm). Also, the term "crystals" refers to particles having a highly regular, repeating atomic geometry and structure. Likewise, the term "nanocrystals" refers to discrete, single crystals having maximum cross-sectional diameters of between about 2 nm and about 1000 nm. Some exemplary nanocrystals are illustrated in FIGS. 1(a), 1(b), and 5.

Figure 2:
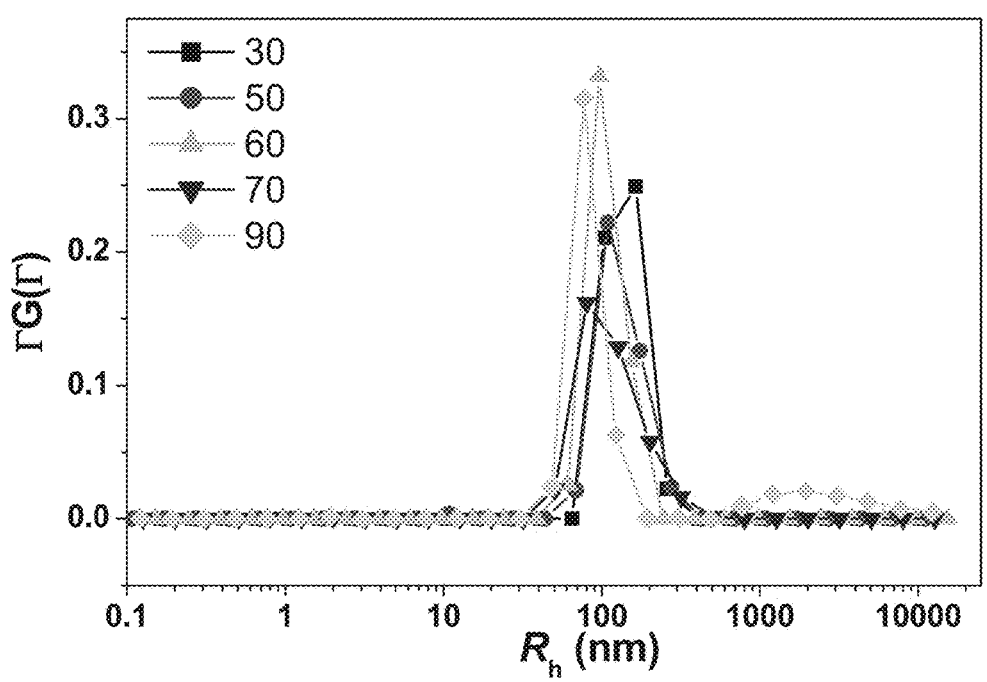
FIG. 2 illustrates the hydrodynamic radii ($R_h$) distributions of the stishovite nanocrystals referred to in FIG. 1, which radii were obtained by the CONTIN analysis of the DLS measurements at various scattering angles between 30° and 90°.

The average particle size of the nanocrystals was further studied with dynamic light scattering ("DLS") measurement. The nanocrystals were dispersed in water and the hydrodynamic radius ("$R_h$") at different scattering angles (from 90° to 30°) were measured by DLS and analyzed by CONTIN method (see FIG. 2). The $R_{h0}$ values were calculated by extrapolating $R_h$ to 0°. The average particle diameter of the nanocrystals calculated from the DLS study was 282±16 nm with a polydispersity of 1.25, and this value further supports the results obtained from the TEM and SEM images. Furthermore, it indicates that the nanocrystals are not agglomerated but remain suspended as homogenous individual nanocrystals in aqueous media. The weak angular dependence of the $R_h$ values suggests that the suspended particles are generally isotropic in shape. Analysis of the EDS spectrum of the specimen showed only Si and O, confirming that the compound was indeed $SiO_2$ without any impurities.

Figure 3:
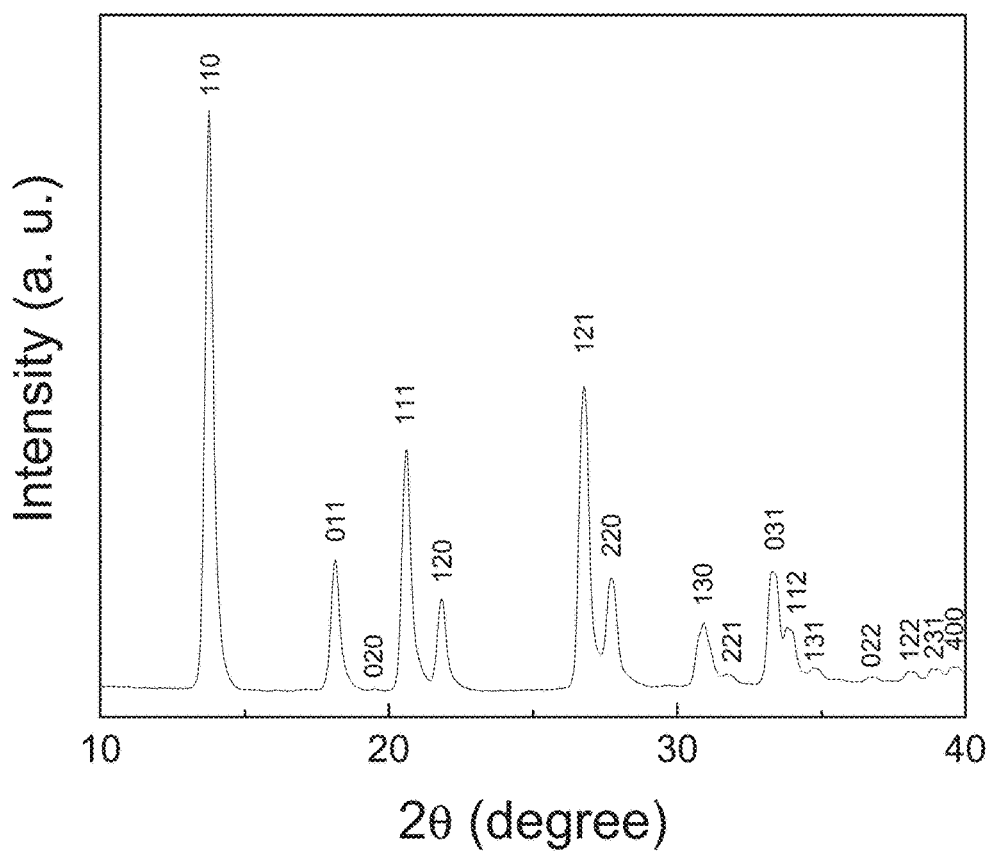
FIG. 3 is the XRD pattern of the stishovite nanocrystals referred to in FIG. 1.

The phase of the stishovite specimen was also confirmed by XRD. FIG. 3 shows an exemplary XRD pattern of stishovite nanocrystals. All the observed reflexes in the diffractogram are unambiguously indexed to the P4$_2$/mnm tetragonal crystal structure of stishovite (JCPDS file 45-1374). The lattice parameters were refined to be a=0.4186 and c=0.2669 nm, which are comparable to the standard values of a=0.4179 and c=0.2666 nm.

Figure 4A:
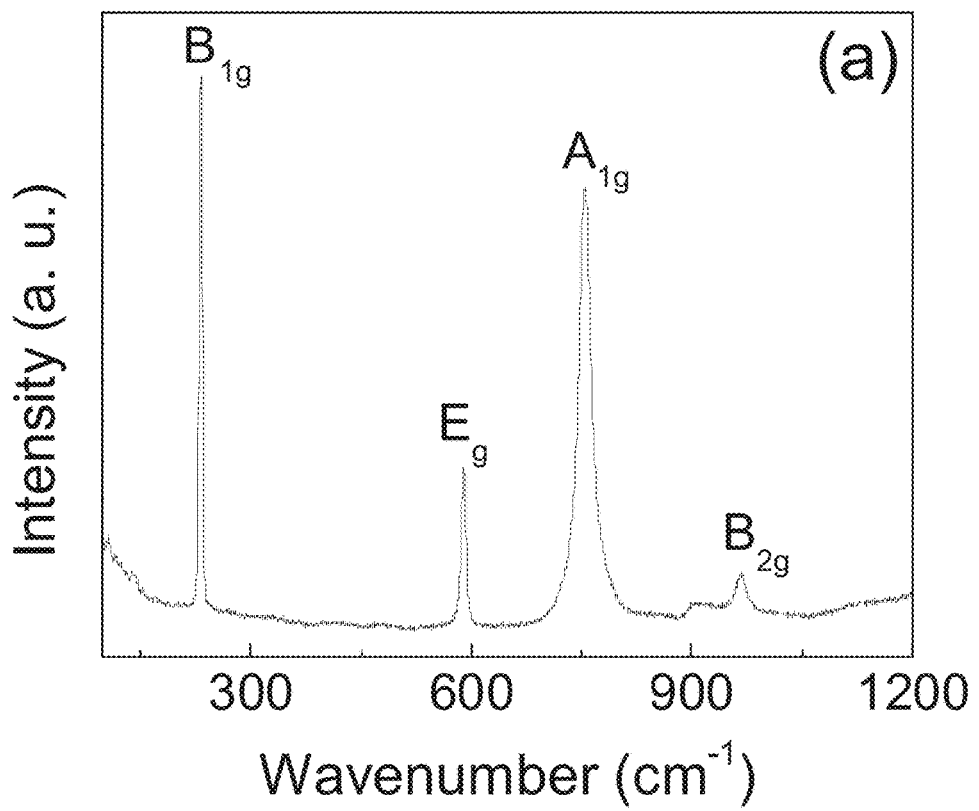
FIG. 4(a) is the Raman spectrum of the stishovite nanocrystals referred to in FIG. 1.

The structure of the stishovite was also confirmed by Raman spectroscopy. The Raman spectrum (FIG. 4(a)) of the stishovite was characterized by well resolved bands at 232, 590, 755, and 967 cm$^{-1}$, which are assigned to the $B_{1g}$, $E_g$, $A_{1g}$, and $B_{2g}$ fundamental mode of vibrations, respectively. Similar bands were also observed for both synthetic and natural bulk stishovite. See, e.g., Hemley et al., Phys. Chem. Minerals 13, 285 (1986); Gillet et al., J. Geophys. Res. 95, 21635 (1990). These bands are characteristic of rutile-structured oxides.

Figure 4B:
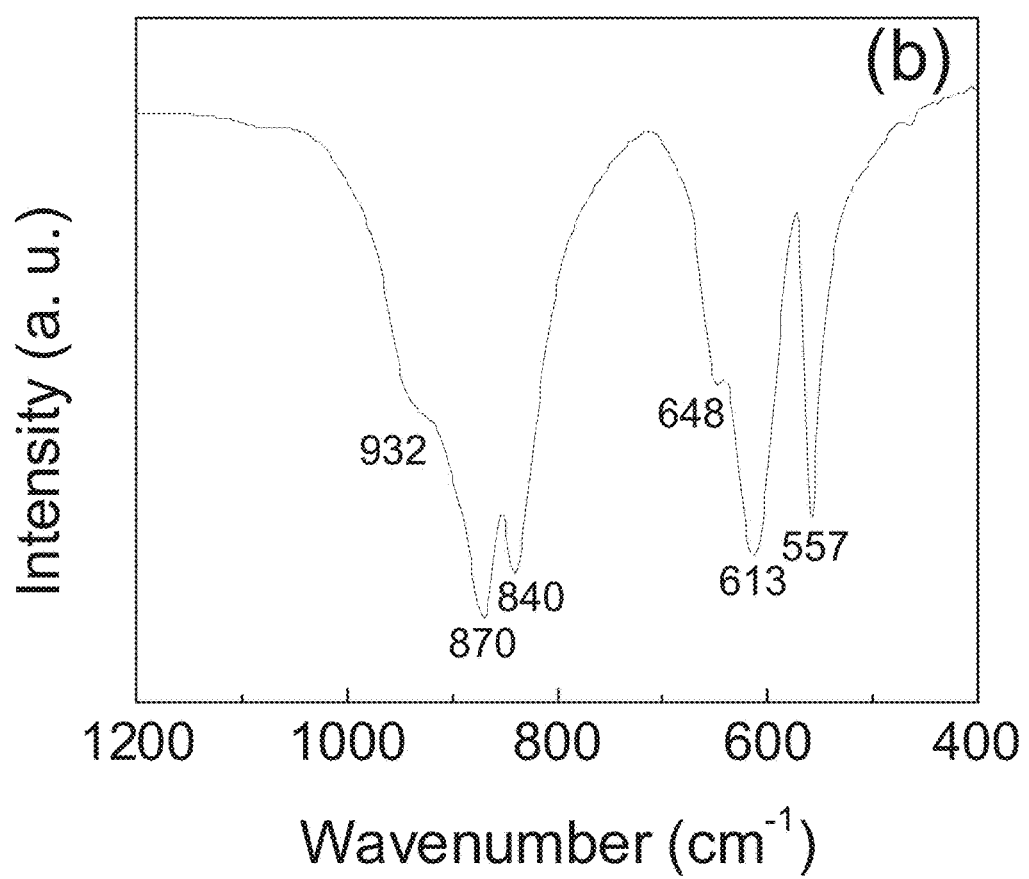
FIG. 4(b) is the FT-IR spectrum of the stishovite nanocrystals referred to in FIG. 1.

The stishovite specimen was further studied with the FT-IR (FIG. 4(b)). Six bands were observed at 557, 613, 648, 840, 870, and 932 cm$^{-1}$. They can be assigned to the $E_u$ and $A_{2u}$ modes of vibrations. The position of the bands deviates from those reported by Hofmeister and Williams for synthetic and natural stishovite because positions in rutile-structured compounds principally depend on particle size and geometry. Hofmeister et al., Amer. Miner. 75, 951 (1990); Williams et al., J. Geophys. Res. 98, 22157 (1993). See also, Luxon et al., J. Chem. Phys. 50, 1366 (1969). No band was observed in the region from 2500 to 4000 cm$^{-1}$, which indicates that the sample was free of silanol groups within the detection limits of IR spectroscopy.

In an attempt to understand the effect of the pore structure on the synthesis of the stishovite nanocrystals, analogous experiment were performed using mesoporous silica KIT-6 with Ia3d cubic symmetry (gyroid structure) as the precursor. Faceted single crystalline stishovite nanocrystals were observed (see FIG. 5) with larger sizes (400 to 800 nm) compared to the nanocrystals obtained from the SBA-16 (200 to 400 nm). In addition, SBA-15, which has hexagonal honeycomb structure with 1D mesochannels, was investigated as a starting material. In this case, XRD evidence suggests that coesite was obtained. According to TEM and SEM analysis, no well defined morphology of the reaction product was observed when using SBA-15 as a starting material.

This invention also relates, in part, to a work tool comprising nanoparticles of stishovite silica. Such a work tool may be configured and adapted for cutting, drilling, abrading, polishing, machining, or grinding. Examples of work tools include drill bits, sand paper, router bits, saw blades, polishing wheels, abrasive pads and wheels, grinding stones, abrasive cloth, grinding/polishing balls, cutting chains, and the like. Typically, the work tool has a surface that is at least partially impregnated with or coated with nanoparticles of stishovite silica. For example, the work tool may be coated with an adhesive or resin containing nanoparticles, or the work tool surface may have nanoparticles embedded into the surface during its manufacturing process.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

EXAMPLES

In the following examples, these chemicals were used without further purification: Triblock copolymer Pluronic F127 ($EO_{106}PO_{70}EO_{106}$) and P123 ($EO_{20}PO_{70}EO_{20}$) (commercially available from BASF, USA), tetraethyl orthosilicate ("TEOS," commercially available from Sigma-Aldrich), hydrochloric acid (commercially available from EMD Chemicals), butanol (commercially available from Alfa Aesar). Pluronic F127 and P123 are block copolymers based on ethylene oxide and propylene oxide. PLURONIC® is a registered trademark of BASF Corp. of N.J.

Synthesis of SBA-16

In a typical synthesis procedure, 1.0 g of F127 was dissolved in 48 g of distilled water and 2.1 g of hydrochloric acid (35 wt %). To it, 3.1 g of butanol was added at 45° C. After stirring for 1 h, 4.8 g TEOS was added and the stirring of the mixture was continued for 24 h for the mesostructure formation. Hydrothermal treatment was carried out by aging the mixture for another 24 h in static conditions. The product was filtered, dried at 100° C. without washing, and then calcined in air at 550° C. for 5 h. The molar composition of the starting reaction mixture was 0.0035 F127/1 TEOS/1.8 butanol/0.91 HCl/117 $H_2O$.

Synthesis of KIT-6

Mesoporous silica with cubic Ia3d symmetry was synthesized according to Kleitz et al., Chem. Commun., 2136 (2003). In a typical synthesis procedure, 1 g of P123 was dissolved in 36 g of distilled water and 1.95 g of conc. HCl (35%). To this, 1 g of butanol was added under stirring at 35° C. After 1 h stirring, 2.15 g of TEOS was added. The mixture was left under stirring for 24 h at 35° C., and subsequently heated for 24 h at 100° C. under static conditions. The product was filtered and dried at 100° C. followed by calcination at 550° C. for 5 h in air. The molar composition of the starting reaction mixture was 0.017 P123/1 TEOS/1.83 HCl/195 $H_2O$/1.31 butanol.

Synthesis of SBA-15

Mesoporous hexagonal silica SBA-15 was synthesized by using P123 as a structure directing agent and TEOS as silica source according to the procedure reported previously. See, Zhao et al., Science 279, 548 (1998); Jun et al., J. Am. Chem. Soc. 122, 10712 (2000). In a typical synthesis, 1.0 g of P123 was dissolved in 38.0 mL of 1.6 M hydrochloric acid. To it, 2.2 g of TEOS was added at 35° C. under stirring with a magnetic stirrer until TEOS was completely dissolved. The mixture was placed in an oven for 24 h at 35° C. for mesostructure formation, and subsequently for 6 h at 100° C. for hydrothermal treatment. The product was filtered, dried at 100° C., and then calcined in air at 550° C. for 5 h.

Multi-Anvil Synthesis Method

The experiments were carried out in a multi-anvil assembly with a 1500-ton hydraulic press. The samples were encapsulated in Pt capsules of 2.5 mm diameter and 3 mm length. A capsule was placed inside an alumina sleeve, a cylindrical Re heater, and a zirconia sleeve for thermal insulation. This assembly was placed inside a $Cr_2O_3$ doped MgO octahedron with an edge length of 8 mm and 14 mm diameter. The octahedron was placed between eight corner-truncated tungsten carbide cubes with pyrophyllite gaskets. The resulting cubic assembly was placed into the press. In the following, the sample was pumped up to the final pressure with a rate of 2 GPa/h. After the final pressure was reached, the sample was heating to 400° C. temperature with a heating rate of 100K/min. A sample was kept at the final temperature for 5 minutes and then quenched. The pressure was released with a rate of 3 GPa/h. After ambient pressure was reached, the samples were extracted from the Pt capsule.

Characterization of the Materials

The formation of the stishovite phase, study of its structure and microstructures were carried out by X-ray diffraction ("XRD"), transmission electron microscopy ("TEM"), scanning electron microscopy ("SEM"), Raman and Fourier-transform infrared ("FT-IR") spectroscopy. The TEM images were taken on a JEOL JEM-2000 electron microscope operated at 200 kV. Samples for the TEM analysis were prepared by dispersing the particles in acetone and dropping a small volume of it onto a holey carbon film on copper grid. SEM images of the specimen were taken on a Hitachi S-4300 SEM. The XRD pattern was recorded on an imaging plate using a Rigaku D/MAX-RAPID microdiffraction system with a Mo Kα radiation source (λ=0.071073 nm). The Raman spectrum of the specimen was collected using a Horiba-Jobin Yvon LabRam-HR spectrometer equipped with a confocal microscope (Olympus BX-30), a 532 nm notch filter, and a single stage monochromator. It was collected at ambient condition with 532 nm excitation (20 mW, YAG laser) in the 100-1200 $cm^{-1}$ region. The FT-IR spectrum was collected on Thermo Mattson Satellite FTIR spectrometer, using KBr pellets.

The average size of the synthesized nanocrystals was confirmed by dynamic light scattering ("DLS") technique. A BI-9000 AT multi-channel digital correlator was used to measure the intensity-intensity time correlation function. The constrained regularized CONTIN method was used to analyze the field correlation function g (τ) and to get the characteristic line width Γ. The hydrodynamic radius ($R_h$) of the nanocrystals can be calculated via the Stokes-Einstein equation: $R_h=kT/(6\pi\eta D)$, where k is the Boltzmann constant and η is the viscosity of the solvent at temperature T. The translational diffusion coefficient D was converted to Γ through the following equation: $D=\Gamma/q^2$. From a plot of ΓG(Γ) versus $R_h$, the particle-size distribution in solution was obtained.

The invention claimed is:

1. A method of preparing nanosized single crystals (nanocrystals) of stishovite silica, the method consisting of:
   heating a cubic mesoporous silica starting material under a pressure ranging from 10 GPa to 20 GPa to a temperature ranging from 300° C. to 400° C.; and
   cooling the material to room temperature;
   thereby preparing nanocrystals of stishovite silica having an average particle size of between 200 nm and 800 nm.

2. The method according to claim 1, wherein said cubic mesoporous silica is at least one selected from the group consisting of KIT 6 and SBA 16.

3. The method according to claim 1, wherein said nanocrystals of stishovite silica have an average particle size of between 200 nm and 400 nm.

4. The method according to claim 1, wherein said nanocrystals of stishovite silica have an average particle size of between 400 nm and 800 nm.

5. The method according to claim 1, wherein said heating is carried out for between 2 minutes and 20 minutes.

* * * * *